Oct. 6, 1964
R. A. SCHULTZ
3,151,480
LOAD CELL
Filed Aug. 10, 1960
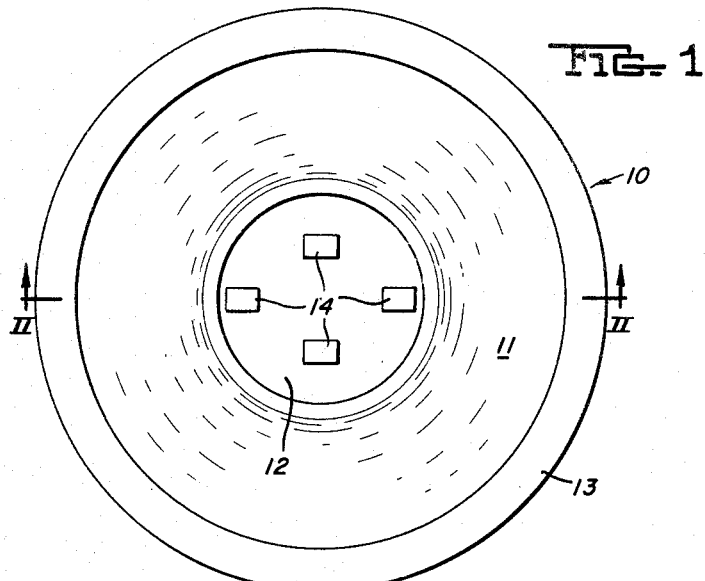
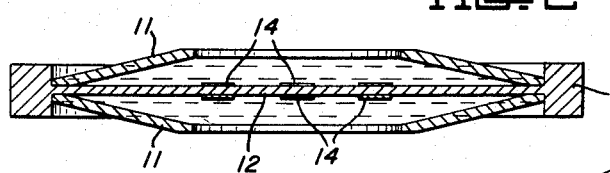
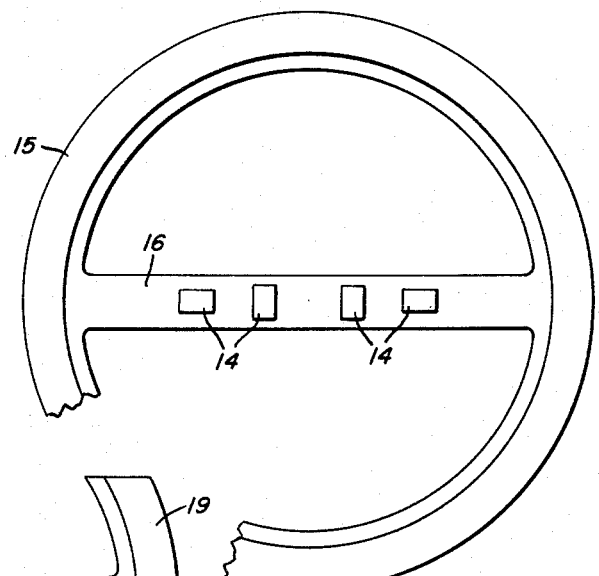
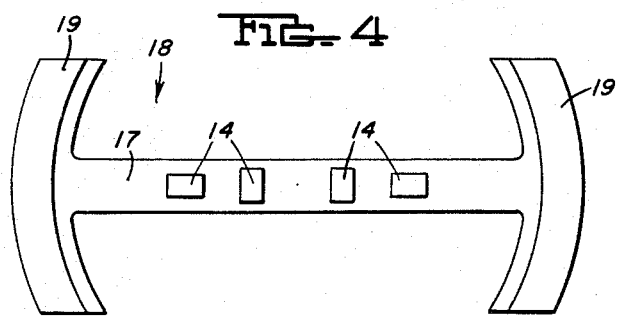
INVENTOR
ROBERT A. SCHULTZ
By Donald G. Dalton
Attorney

United States Patent Office 3,151,480
Patented Oct. 6, 1964

3,151,480
LOAD CELL
Robert A. Schultz, Penn Hills Township, Allegheny
County, Pa., assignor to United States Steel Corporation, a corporation of New Jersey
Filed Aug. 10, 1960, Ser. No. 48,626
6 Claims. (Cl. 73—141)

This invention relates to load cells and, in particular, to a cell of low height adapted for measurement of tensile or compressive loads.

Load cells have been constructed by the attachment of strain gages to members axially loaded as columns. The height of such cells is excessive for many potential applications.

I have invented a load cell including a disc-like primary member yieldable under pressure and a secondary member subjected to tension as a result of the yielding of the disc-like member under load. In a preferred embodiment, one or more dished washers, e.g., Belleville-spring washers, may serve as the primary member. A disc or strap having a strain gage thereon is mounted therewith so as to be stressed in tension as a result of compression of the washers. This combination affords a cell of minimum height.

A complete understanding of the invention may be obtained from the following detailed description and explanation which refer to the accompanying drawings illustrating the present preferred embodiment. In the drawings:

FIGURE 1 is a plan view;
FIGURE 2 is a section taken along the plane of line II—II of FIGURE 1; and
FIGURES 3 and 4 are plan views of modified secondary or tension members.

Referring now in detail to the drawings and, for the present, particularly to FIGURES 1 and 2, my improved cell 10 comprises a pair of dished or Belleville-spring washers or discs 11 disposed on opposite sides of a flat disc 12 of sheet metal. The disc has a thickened marginal ring 13 against the interior of which the peripheries of washers 11 abut closely. Strain gages 14 are affixed to disc 12 in positions such that they are affected by dimensional changes in the disc.

It will be evident that, on application of compressive force axially to washers 11, they will be slightly collapsed and, as a result, will tend to enlarge disc 12 radially. This dimensional change alters the resistance of gages 14 whereby a significant signal may be obtained, proportional to the load applied.

Instead of disc 12, the secondary or tension member may be a ring 15, shown in FIGURE 3, having a diametral sheet strap 16 to which strain gages 14 are attached. As a further modification, the truncated ring 18 of FIGURE 4, may be utilized. It is generally similar to ring 15 but includes simply arcuate segments 19, one at each end of connecting strap 17.

It will be apparent that the cell of my invention has not only the advantage of low overall height, but also of extreme simplicity and a wide range. A slight compression of spring washers 11 is magnified as the tension applied to disc 10 or to the strap 16 of ring 15. Easily interpreted signals are produced thereby.

Although I have disclosed herein the preferred embodiment of my invention, I intend to cover as well any change or modification therein which may be made without departing from the spirit and scope of the invention.

I claim:

1. A load cell comprising a dished disc and a sheet extending across the concave face of said disc, means transmitting to said member the radial extension of said disc resulting from a compressive load applied axially thereof, and a strain gage secured to said member.

2. A load cell comprising a pair of dished discs arranged in opposed relation, a sheet member extending diametrally therebetween, said discs being disposed one on each side of said member with their concave faces adjacent thereto, means transmitting to said member the radial extension of said discs resulting from a compressive load applied axially thereof, and a strain gage secured to said member.

3. A load cell as defined in claim 2, characterized by said member being a ring with a diametral strap.

4. A load cell as defined in claim 2, characterized by said member being a strap having arcuate segments at its ends.

5. A load cell as defined in claim 2, characterized by said member being a disc.

6. A load cell as defined in claim 5, characterized by said member being a flat disc, said means being raised peripheral portions on said flat disc engageable by the edges of said dished discs.

References Cited in the file of this patent

UNITED STATES PATENTS

| | | |
|---|---|---|
| 1,875,524 | Templin | Sept. 6, 1932 |
| 2,636,964 | Lancor et al. | Apr. 28, 1953 |
| 2,848,892 | Hoffman | Aug. 26, 1958 |
| 3,036,283 | Singdale et al. | May 22, 1962 |

FOREIGN PATENTS

| | | |
|---|---|---|
| 1,025,170 | Germany | Feb. 27, 1958 |

UNITED STATES PATENT OFFICE
CERTIFICATE OF CORRECTION

Patent No. 3,151,480  October 6, 1964

Robert A. Schultz

It is hereby certified that error appears in the above numbered patent requiring correction and that the said Letters Patent should read as corrected below.

Column 2, line 18, after "sheet" insert -- tension member --.

Signed and sealed this 30th day of March 1965.

(SEAL)
Attest:

ERNEST W. SWIDER
Attesting Officer

EDWARD J. BRENNER
Commissioner of Patents